US006993346B2

(12) United States Patent
Matsuyama

(10) Patent No.: US 6,993,346 B2
(45) Date of Patent: Jan. 31, 2006

(54) INFORMATION RECEIVING APPARATUS AND INFORMATION PROVIDING APPARATUS THAT COMMUNICATES INFORMATION CORRESPONDING TO LOCATION OF THE INFORMATION RECEIVING APPARATUS

(75) Inventor: Tetsuya Matsuyama, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 519 days.

(21) Appl. No.: 09/813,970

(22) Filed: Mar. 22, 2001

(65) Prior Publication Data

US 2001/0031642 A1 Oct. 18, 2001

(30) Foreign Application Priority Data

Mar. 22, 2000 (JP) ....................................... 2000-079968
Feb. 15, 2001 (JP) ....................................... 2001-038020

(51) Int. Cl.
*H04Q 7/00* (2006.01)

(52) U.S. Cl. ..................................... 455/456.3; 701/211

(58) Field of Classification Search .............. 455/456.1, 455/456.2, 456.3, 457, 414.1–414.3; 701/211, 701/212, 213, 206; 340/995.1–995.2, 995.25
See application file for complete search history.

(56) References Cited

U.S. PATENT DOCUMENTS 5,438,687 A 8/1995 Suchowerskyj et al.
6,021,371 A 2/2000 Fultz
6,169,897 B1 * 1/2001 Kariya .................... 455/456.3
6,343,317 B1 * 1/2002 Glorikian .................... 709/218
6,356,761 B1 * 3/2002 Huttunen et al. ........ 455/456.1

FOREIGN PATENT DOCUMENTS

| | | |
|---|---|---|
| JP | A6120877 | 4/1994 |
| JP | 10-103972 A | 4/1998 |
| JP | 11-167695 A | 6/1999 |
| WO | 93/01665 A1 | 1/1993 |

* cited by examiner

*Primary Examiner*—Nick Corsaro
(74) *Attorney, Agent, or Firm*—Birch, Stewart, Kolasch & Birch, LLP

(57) ABSTRACT

An information receiving apparatus receives information items from a plurality of information providing apparatuses. An information item contains information and an information ID. The information item includes information in more detail as the location of the information providing apparatus is closer to an area specified by the information ID. The information providing apparatus includes a data storage unit storing an information item and a transmission unit transmitting the information item to the information receiving apparatus. The information receiving apparatus includes an ID storage unit storing an information ID, a reception unit receiving a plurality of information items from an arbitrary one of information providing apparatuses, and an output unit retrieving from received information items an information item containing an information ID stored in ID storage unit.

44 Claims, 12 Drawing Sheets

FIG.3A

INPUT INFORMATION ID

10010 : HORYUJI TEMPLE
BULLET TRAIN
TOKYO→KYOTO
KINTETSU LINE
KYOTO→NARA

FIG.3C

10010 : HORYUJI TEMPLE
TAKE BUS IN FRONT OF NARA STATION AND LEAVE AT HORYUJI

20-MIN DELAY TODAY DUE TO TRAFFIC JAM CAUSED BY CAR ACCIDENT

FIG.3D

10010 : HORYUJI TEMPLE
SUBWAY
SHIN OSAKA→NAMBA
KINTETSU LINE
NAMBA→NARA

SEAT AVAILABLE IN KINTETSU EXPRESS (NAMBA→NARA)

FIG.9

| ID | DATA | FIRST LINK | | SECOND LINK | | THIRD LINK | |
|---|---|---|---|---|---|---|---|
| | | ID | PRIORITY | ID | PRIORITY | ID | PRIORITY |
| ID OF HORYUJI | INFORMATION ABOUT HORYUJI | ID OF BUS ROUTE C | 1ST | ID OF BUS ROUTE D | 2ND | ID OF BUS ROUTE E | 3RD |
| ID OF ROUTE C | INFORMATION ABOUT BUS ROUTE C | | | | | | |
| ID OF ROUTE D | INFORMATION ABOUT BUS ROUTE D | | | | | | |
| ID OF ROUTE E | INFORMATION ABOUT BUS ROUTE E | | | | | | |
| • • • | • • • | | | | | | |

INFORMATION RECEIVING APPARATUS AND INFORMATION PROVIDING APPARATUS THAT COMMUNICATES INFORMATION CORRESPONDING TO LOCATION OF THE INFORMATION RECEIVING APPARATUS

BACKGROUND OF THE INVENTION

1. Field of the Invention

The present invention relates to a technique of transmitting information between information processing devices such as computers. In particular, the invention relates to an information transmission technique using a portable information terminal device receiving information transmitted from a plurality of transmission devices.

2. Description of the Background Art

A system for transmitting geographic information to a mobile terminal device is one example of systems for communicating information between computers. As this type of system, there is a system for transmitting geographic information from a computer which stores geographical database to a mobile terminal device. Japanese Patent Laying-Open No. 6-120877 discloses a navigation system for transmitting navigation information based on position information of a mobile terminal device.

Referring to FIG. 1, this navigation system includes a center computer 700 generating voice guidance according to destination information received from a radio mobile station 500 via a radio base station 400, radio base stations 400, 410 and 420 connected to center computer 700 via a public circuit 600 and communicating by radio with radio mobile station 500 located in respective management zones 402, 412 and 422, and radio mobile station 500.

Radio mobile station 500 includes a circuit to be used by a travelling person for entering destination information, a circuit for transmitting the entered destination information to center computer 700 via radio base station 400, and a circuit for outputting voice guidance received from radio base stations 400, 410 and 412.

Center computer 700 includes: a geographical database; a voice guidance generating circuit connected to the geographical database and public circuit 600 for generating a first voice guidance for providing a route from a present position 404 to a way point 406 according to the destination information received from radio base station 400 that manages zone 402 including the present position 404, the present position of radio mobile station 500 recognized from position information of radio base station 400, and the geographical database; and a transmission circuit connected to the voice guidance generating circuit for transmitting the generated first voice guidance to radio mobile station 500 via radio base station 400. Center computer 700 further includes an in-zone signal reception circuit receiving from radio base station 410 that manages zone 412 including way point 406 a signal (in-zone signal) indicating presence of radio mobile station 500 in the zone including way point 406.

The voice guidance generating circuit includes a circuit for generating a second voice guidance giving a route from way point 406 to destination 408. The transmission circuit includes a circuit for transmitting the generated second voice guidance to radio mobile station 500 via radio base station 410.

According to this navigation system, radio mobile station 500 transmits destination information to center computer

700 via radio base station 400. The voice guidance generating circuit of center computer 700 generates, according to the destination information received from radio base station 400 and position information of radio base stations 400 and 410, the first voice guidance supplying a route from present position 404 to way point 406. The voice guide generating circuit of center computer 700 further generates the second voice guidance supplying a route from way station 406 to destination 408. The transmission circuit of center computer 700 transmits the generated first voice guidance and second voice guidance to radio mobile station 500 via radio base stations 400 and 410, respectively. The in-zone signal reception circuit of center computer 700 receives the in-zone signal of radio mobile station 500 from radio base station 410 that manages zone 412 including way point 406.

In this way, in accordance with the destination information and other information received via radio base station 400, the first voice guidance indicating a route from present position 404 to way point 406 is transmitted from center computer 700 to radio mobile station 500. The first voice guidance is output from radio mobile station 500. A user carrying radio mobile station 500 follows the first voice guidance and accordingly moves to zone 412 managed by radio base station 410. In accordance with the in-zone signal and the like of radio mobile station 500 received via radio base station 410, the second voice guidance indicating a route from way point 406 to destination 408 is transmitted to radio mobile station 500. Radio mobile station 500 outputs the second voice guide. A travel route 430 from present position 404 to way point 406 and further to destination 408 can consequently be provided from center computer 700 to radio mobile station 500 by means of the voice guidance. The navigation system thus provided enables the user to reach destination 408 even in an unfamiliar area.

However, since the voice guidance of this navigation system that is transmitted via radio base stations 400, 410 and 420 from center computer 700 to radio mobile station 500 is based on the geographical database of center computer 700 connected via public line 600, the voice guidance provides details to the same extent. In other words, even if radio mobile station 500 is approaching destination 408, more detailed information regarding surroundings of destination 408 for example is not provided.

SUMMARY OF THE INVENTION

One object of the present invention is to provide an information receiving apparatus and an information providing apparatus, employed in a system for receiving data by the information receiving apparatus from a plurality of information providing apparatuses, so as to enable information to be output that is adapted for a location where this information is received.

Another object of the present invention is to provide an information receiving apparatus and an information providing apparatus to enable information to be output that is adapted for a location where this information is received and is required by a user.

Still another object of the present invention is to provide an information receiving apparatus and an information providing apparatus to enable information to be output depending on value of the information, the information being adapted for a place where the information is received and required by a user.

Still another object of the present invention is to provide an information receiving apparatus in which a user can select necessary information.

A further object of the present invention is to provide an information receiving apparatus and an information providing apparatus to enable local information to be output that is adapted for a location where this information is received.

A still further object of the present invention is to provide an information receiving apparatus and an information providing apparatus to enable information to be output that relates to information required by a user.

An information receiving apparatus according to one aspect of the present invention receives information from a plurality of information providing apparatuses. The information receiving apparatus includes: an identification data storage circuit storing information identification data for identifying information to be selected; a reception circuit receiving a plurality of information items from an arbitrary one of the information providing apparatuses; a storage circuit connected to the reception circuit for storing the information items received by the reception circuit; and an output circuit connected to the identification data storage circuit and the storage circuit for selecting and outputting an information item having a predetermined relation with the information identification data stored in the identification data storage circuit.

The identification data storage circuit stores information identification data for identifying information designated by a user. The reception circuit receives a plurality of information items from an arbitrary one of the information providing apparatuses. The storage circuit stores the information items received by the reception circuit. The output circuit selects and outputs an information item having a predetermined relation with the information identification data stored in the identification data storage circuit from the information items stored in the storage circuit.

Accordingly, the information receiving apparatus receives information items that are identified by the same information identification data but different from each other depending on the information providing apparatuses. For example, when the information identification data is information which specifies a local area, an information providing apparatus located closer to the area specified by the information identification data stores more detailed information regarding that area. Then, the information receiving apparatus can be provided that receives and displays information designated by a user that is of a greater particularity as the apparatus approaches a specific area.

Preferably, the information item contains relevant information identification data for identifying information relevant to information contained in the information item and includes priority of the relevant information. The output circuit includes a circuit that selects an information item containing relevant information identification data identical to the information identification data stored in the identification data storage circuit from the information items stored in the storage circuit and then outputs the selected information item according to priority of the selected information item.

The information receiving apparatus can display relevant information associated with information designated by the user in the order starting from information with higher priority.

Still preferably, the information receiving apparatus includes an input circuit connected to the identification data storage circuit for entering information identification data of information to be selected.

The user can enter by means of the input circuit information identification data for identifying desired information to be displayed.

Still preferably, the information item further contains relevant information identification data for identifying information relevant to information contained in the information item. The output circuit includes a circuit for selecting and outputting an information item containing either information identification data or relevant information identification data matching the information identification data stored in the identification data storage circuit from the information items stored in the storage circuit.

The information receiving apparatus can thus display information associated with relevant information relating to information designated by the user.

According to another aspect of the invention, an information receiving apparatus receives information from a plurality of information providing apparatuses. The information receiving apparatus includes an identification data storage circuit storing information identification data for identifying information to be selected, an identification data transmission circuit connected to the identification data storage circuit for transmitting the information identification data stored in the identification data storage circuit to an arbitrary one of the information providing apparatuses, a reception circuit receiving a selected information item transmitted from the arbitrary one of the information providing apparatuses in response to the information identification data transmitted by the identification data transmission circuit, a storage circuit connected to the reception circuit for storing the information item received by the reception circuit, and an output circuit connected to the storage circuit for outputting the information item stored in the storage circuit.

The identification data storage circuit stores information identification data for identifying information designated by a user. The identification data transmission circuit transmits the information identification data to the information providing apparatus. The information providing apparatus selects an information item having a predetermined relation with the information identification data stored in the identification data storage circuit and then transmits the selected information item to the information receiving apparatus. The reception circuit receives from the information providing apparatus the information item corresponding to the information identification data. The storage circuit stores the information item received by the reception circuit. The output circuit outputs the information item stored in the storage circuit.

Accordingly, the information receiving apparatus receives information items that are identified by the same information identification data but different from each other depending on information providing apparatuses. For example, when the information identification data is information which specifies a local area, an information providing apparatus located closer to the area specified by the information identification data stores more detailed information regarding that area. Then, the information receiving apparatus can be provided that receives and displays information designated by a user that is of a greater particularity as the apparatus approaches a specific area.

According to still another aspect of the present invention, an information providing apparatus is employed in an information providing system including an information receiving apparatus and a plurality of information providing apparatuses transmitting information to the information receiving apparatus. The information providing apparatus includes an information storage circuit storing a plurality of information items. The information items each contain information and information identification data for identifying the information. The information identification data is common to the information providing apparatuses. The information contained in the information items differs depending on information identification data and information providing apparatuses. The information providing apparatus further includes a reception circuit receiving information identification data from the information receiving apparatus, an identification data storage circuit connected to the reception circuit for storing the received information identification data, and a transmission circuit connected to the information storage circuit and the identification data storage circuit for selecting an information item having a predetermined relation with the identification data stored in the identification data storage circuit from the information items stored in the information storage circuit and then transmitting the selected information item to the information receiving apparatus.

The reception circuit receives information identification data for identifying information designated by a user from the information receiving apparatus. The identification data storage circuit stores the received information identification data. The transmission circuit selects an information item having a predetermined relation with the information identification data stored in the identification data storage circuit and then transmits the selected information item to the information receiving apparatus. The information receiving apparatus outputs the information item transmitted from the information providing apparatus.

Accordingly, the information providing apparatus stores information items that are identified by the same information identification data but different from each other depending on information providing apparatuses. For example, when the information identification data is information which specifies any local area, an information providing apparatus located closer to the area specified by the information identification data stores more detailed information regarding that area. Then, the information providing apparatus can be provided that transmits information to the information receiving apparatus to allow the receiving apparatus to display the information being designated by a user that is of a greater particularity as the receiving apparatus approaches a specific area.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 3A–3D briefly show information supplied by the information providing system of the invention.

FIG. 9 shows an information structure in an output data storage unit according to the first embodiment.

DESCRIPTION OF THE PREFERRED EMBODIMENTS

Figure 1:
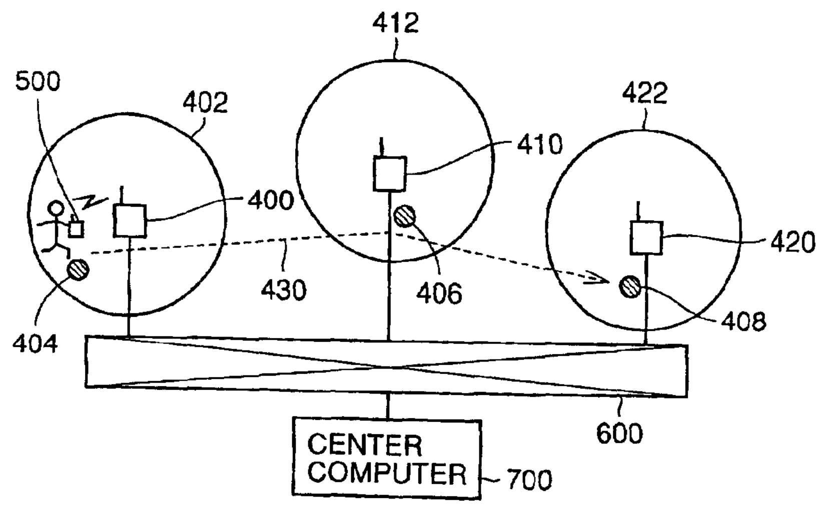
FIG. 1 shows a navigation system of a related art.

Embodiments of the present invention are hereinafter described in conjunction with the drawings. The following description refers to the same components by the same reference character. These components have the same designation and function and detailed description thereof is not repeated as required.

First Embodiment

Figure 2:
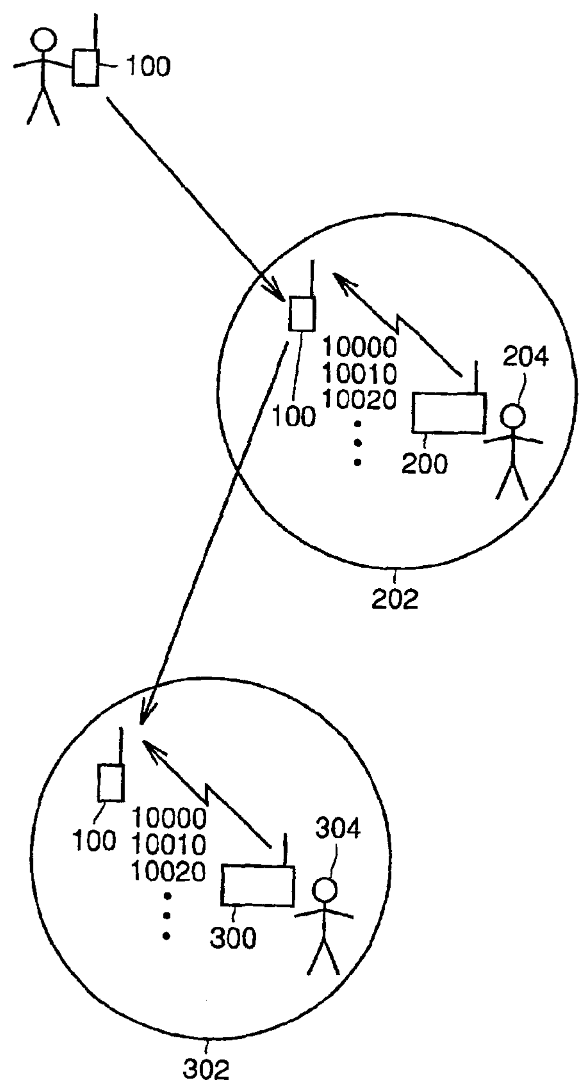
FIG. 2 schematically shows an information providing system according to the present invention.

Referring to FIG. 2, an information providing system according to one embodiment of the present invention includes a portable receiving terminal device 100 and information providing devices 200 and 300 transmitting information to receiving terminal device 100.

Referring to FIGS. 3A–3D, a relation between an entire structure of this information providing system and contents of information is briefly described. As shown in FIG. 3A, a user at home who lives in Tokyo inputs information ID (identification) "10010" representing "Horyuji Temple" for example into receiving terminal device 100. This user then moves to Tokyo Station carrying receiving terminal device 100. When receiving terminal device 100 enters an area 202 where information items can be received from information providing device 200 placed at Tokyo Station, receiving terminal device 100 receives an information item. As shown in FIG. 3B, the information item corresponding to information ID "10010" is displayed on receiving terminal device 100. In accordance with the information item shown in FIG. 3B, the user travels to Nara Station carrying receiving terminal device 100. When receiving terminal device 100 enters an area 302 where information items can be received from information providing device 300 placed at Nara Station, receiving terminal device 100 receives an information item. The information item corresponding to information ID "10010" is displayed on receiving terminal device 100 as shown in FIG. 3C.

Information providing devices 200 and 300 are managed respectively by managing agents 204 and 304 that can get real-time information regarding respective areas where information providing devices 200 and 300 are located. For example, managing agent 304 that manages information providing device 300 acquires information which is difficult to know in real time outside the region near the area specified by information ID data (e.g. traffic jam caused by any car accident which occurred in the area of information providing device 300), and accordingly enters this information into information providing device 300 which it manages. Then, information contents supplied from respective information providing devices 200 and 300 are at the different levels of the particularities depending on the relation between the area specified by the information ID data and respective locations of information providing devices 200 and 300. Further, information contents vary in real time in the region closer to the specified area.

The description below relates to a case where the user carrying receiving terminal device 100 rides on a bullet train and then leaves the train at Shin Osaka Station instead of Kyoto Station without following the instruction as shown in FIG. 3B. When receiving terminal device 100 enters an area where information can be received from an information providing device placed at Shin Osaka Station, receiving terminal device 100 receives information corresponding to information ID "10010" that is displayed as shown in FIG. 3D. The information providing device located at Shin Osaka Station is managed by a managing agent different from managing agents 204 and 304 mentioned above. Therefore, contents displayed on receiving terminal device 100 include a route from the location (Shin Osaka Station) to Horyuji Temple as well as information at the present time (real-time information associated with the route from Shin Osaka Station to Horyuji Temple), instead of the route from Tokyo Station to Horyuji Temple via Shin Osaka Station, for example. In this way, information is appropriately displayed to enable the user to easily arrive at the destination even if the user deviates from the firstly displayed route.

This information providing system is now described in detail. It is noted the information providing system may include a plurality of information providing devices 200 and 300 as discussed in conjunction with FIGS. 2 and 3A–3D; however, they have the same structure and thus information providing device 200 is hereinafter explained as a representative.

Figure 4:
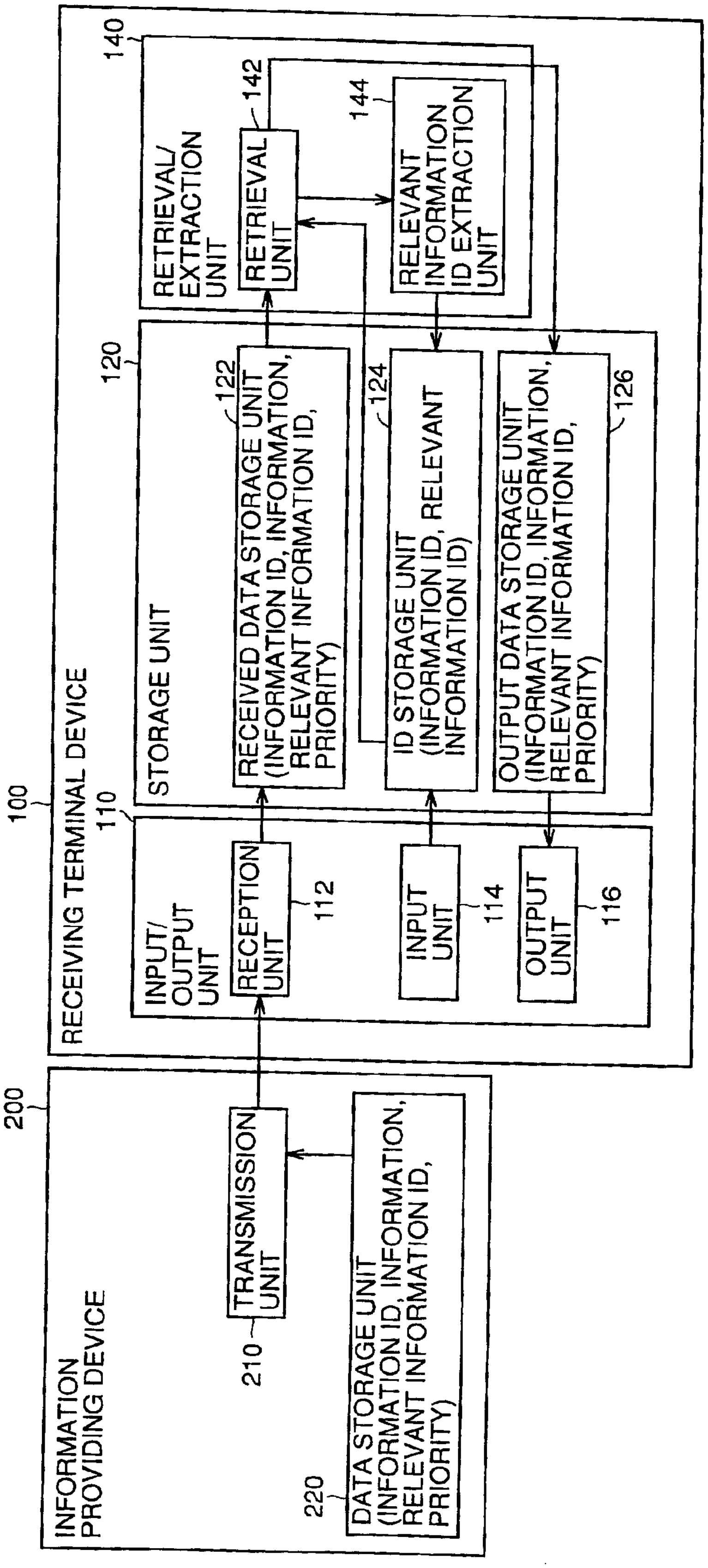
FIG. 4 is a control block diagram of an information providing device and a receiving terminal device according to a first embodiment of the invention.

Referring to FIG. 4, the information providing system according to the first embodiment includes receiving terminal device 100 and information providing device 200.

Receiving terminal device 100 includes an input/output unit 110 connected to information providing device 200 for receiving an information item formed of information ID, information, relevant information ID and priority, a storage unit 120 connected to input/output unit 110 for storing the information item received from information providing device 200, and a retrieval/extraction unit 140 for retrieval of a received information item based on information ID.

Receiving terminal device 100 further includes a processor (not shown) for controlling input/output unit 110, storage unit 120 and retrieval/extraction unit 140. The processor includes a CPU (Central Processing Unit), an ROM (Read Only Memory) for recording programs executed by the CPU and various data, and an RAM (Random Access Memory) for storing intermediate data in processing executed by the CPU (these components are not shown).

Input/output unit 110 includes a reception unit 112 for receiving an information item from a transmission unit 210 in an arbitrary one of a plurality of information providing devices 200, an input unit 114 such as numerical keypad for entering information ID, and an output unit 116 for displaying information received from information providing device 200.

Reception unit 112 may be connected to information providing device 200 by means of radio communication or by means of wired communication. Radio communication is employed in the first embodiment. In this case, when receiving terminal device 100 enters into an area where radio waves from information providing device 200 reach, reception unit 112 receives an information item from information providing device 200.

Input unit 114 is a keyboard including a numerical keypad and the like for inputting information ID. The information ID is represented by numerals, alphabets, a combination thereof or proper name itself such as "Horyuji Temple." Output unit 116 outputs information selected from information items received from information providing device 200 by means of characters or voice.

The information ID includes, in addition to that entered by input unit 114 as described above, an information ID selected from those preliminarily stored in an ID storage unit 124 of receiving terminal device 100. For example, an information ID indicating "lavatory" for example which is frequently retrieved and is not proper noun can be selected by input unit 114 without input thereof by input unit 114.

Storage unit 120 includes a received data storage unit 122 connected to reception unit 112 for storing an information item (information ID, information, relevant information ID and priority) received from information providing device 200, ID storage unit 124 connected to input unit 114 for storing information ID and the like entered by input unit 114, and an output data storage unit 126 connected to output unit 116 for storing data to be output.

Retrieval/extraction unit 140 includes a retrieval unit 142 connected to received data storage unit 122, ID storage unit 124 and output data storage unit 126 for retrieving, from received information items, an information item having an information ID stored in ID storage unit 124, and a relevant information ID extraction unit 144 connected to ID storage unit 124 and retrieval unit 142 for extracting a relevant information ID contained in the information item retrieved by retrieval unit 142.

Retrieval unit 142 retrieves, from information items stored in received data storage unit 122, an information item including an information ID matching an information ID input by input unit 114 and stored by ID storage unit 124. The retrieved information item (information ID, information, relevant information ID and priority) is transmitted to output data storage unit 126 and to relevant information ID extraction unit 144. Relevant information ID extraction unit 144 extracts the relevant information ID included in the information item retrieved by retrieval unit 142. The retrieved relevant information ID is transmitted to ID storage unit 124. Information ID storage unit 124 stores the information ID input by input unit 114 as well as the relevant information ID included in the information item retrieved by using that information ID. Retrieval unit 142 retrieves an information item including information ID that matches the input information ID and relevant information ID included in the information item retrieved by using that information ID.

Information providing device 200 includes a data storage unit 220 for storing an information item formed of information ID, information, relevant information ID and priority, transmission unit 210 connected to data storage unit 220 and receiving terminal device 100 for transmitting the information item stored in data storage unit 220 to receiving terminal device 100, and a control unit for controlling data storage unit 220 and transmission unit 210.

Figures 5A, 5B, 5C, 5D, 5E:
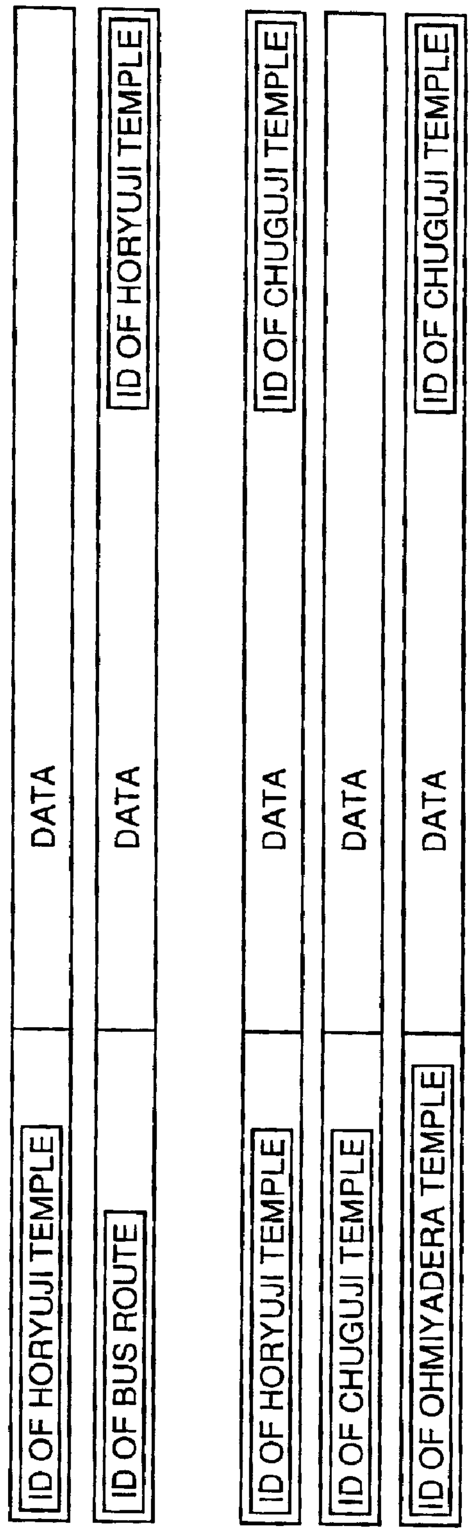
FIGS. 5A–5E and FIGS. 6A–6C show information structures according to the first embodiment of the invention.

Referring to FIG. 5A, an information item includes an information ID and data which is uniquely determined by the information ID in information providing device 200. Referring to FIG. 5B, an information item may include a relevant information ID in addition to the information ID and data. For example, the information item shown in FIG. 5A includes only the information ID indicating "Horyuji Temple" and no relevant information ID. The information item shown in FIG. 5B includes the relevant information ID of information relating to "Horyuji Temple." Then, when retrieval unit 142 retrieves any information item received, according to the information ID indicating "Horyuji Temple," an information item having the information ID indicating "Horyuji Temple " as information ID (FIG. 5A) and an information item having the information ID indicating "Horyuji Temple" as relevant information ID (FIG. 5B) are retrieved.

Referring to FIG. 5C, description below relates to an information item including the information ID indicating "Horyuji Temple" and further including a relevant information ID indicating "Chuguji Temple." When retrieval unit 142 retrieves the information item shown in FIG. 5C, the relevant information ID indicating "Chuguji Temple" included in that information item is stored in ID storage unit 124. Accordingly, an information item including an information ID or a relevant information ID that matches the information ID indicating "Horyuji Temple" or the information ID indicating "Chuguji Temple" is retrieved. As a result, when the information item shown in FIG. 5C is retrieved, the information item shown in FIG. 5D including an information ID matching the information ID indicating "Chuguji Temple" and the information item shown in FIG. 5E including a relevant information ID matching the relevant information ID indicating "Chuguji Temple" are retrieved. In this way, retrieval unit 142 retrieves not only the information item having the information ID indicating "Horyuji Temple" but also information items relating to the information ID indicating "Horyuji Temple."

Figures 6A, 6B, 6C:
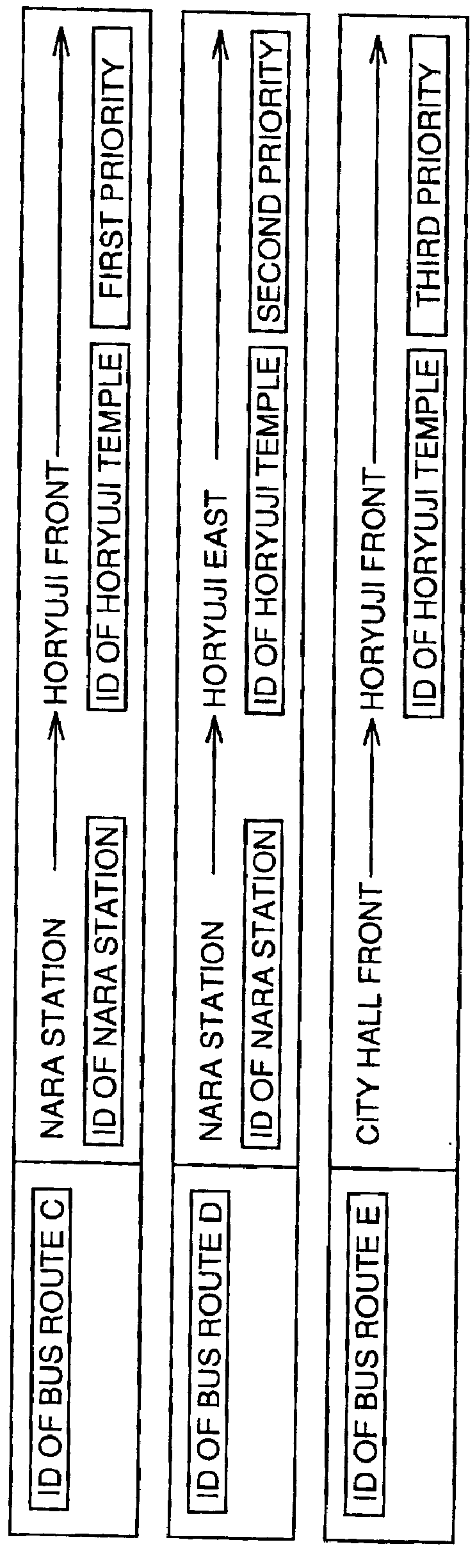

Referring to FIGS. 6A–6C, priority is explained. As discussed above, retrieval unit 142 can retrieve an information item including an information ID stored in ID storage unit 124 as well as an information item including a relevant information ID. Accordingly, various relevant information items can be retrieved, in addition to an information item including an information ID which is entered by input unit 114 at first, such as information items containing relevant information and information items containing information relating to that relevant information. The retrieved information items are stored in output storage unit 126. A large number of information items stored in output data storage unit 126 include information items containing data highly relevant to the input information ID entered at first and information items containing data less relevant thereto. In this case, an information item having a higher priority is output in precedence to other items to output unit 116. When retrieval unit 142 retrieves any information item stored in received data storage unit 122 according to the information ID indicating "Horyuji Temple," resultant information items retrieved include respective information IDs "bus route C," "bus route D" and "bus route E" as shown in FIGS. 6A–6C. The retrieved information items each include a relevant information ID and data representing priority of the relevant information. The priority indicates the degree of relevance with respect to the information ID indicating "Horyuji Temple."

Figure 7:
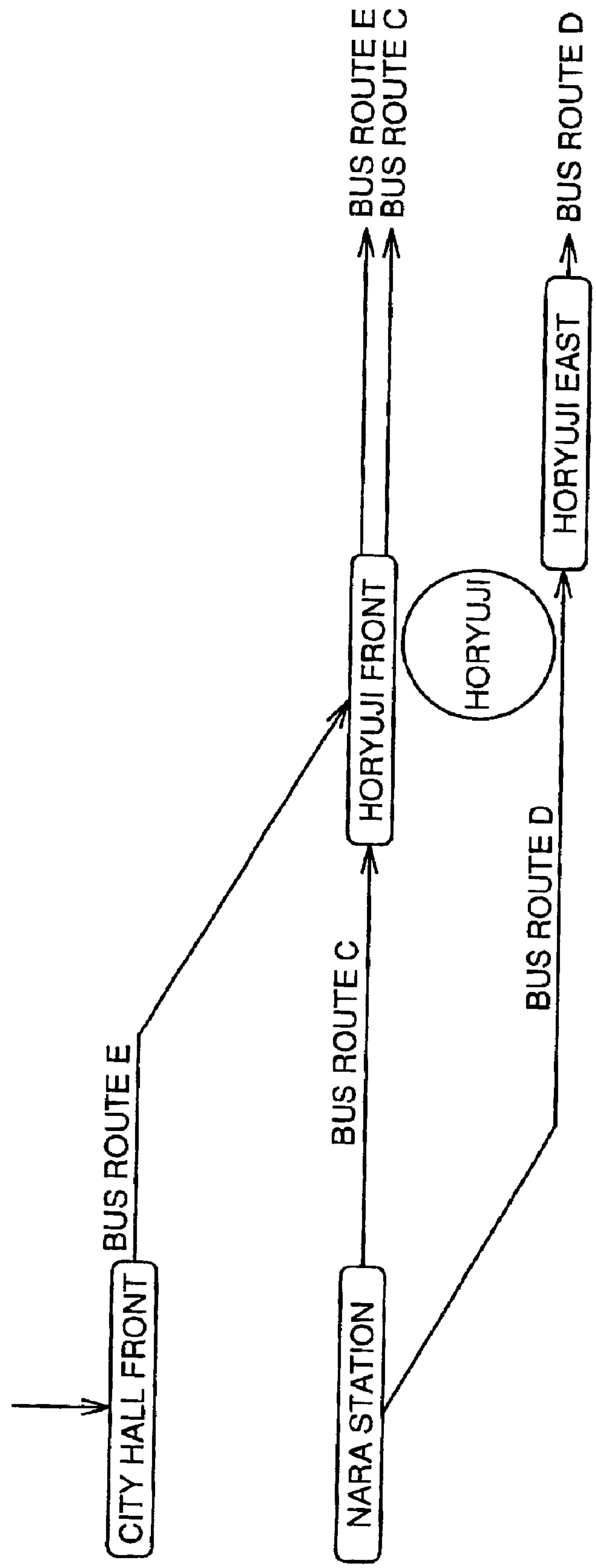
FIG. 7 illustrates priority of relevant information according to the first embodiment.

Referring to FIG. 7, bus route C connects a bus station at Nara Station and the bus station Horyuji Front. Bus route C is the most convenient route to reach Horyuji Temple as the bus station Horyuji Front is closest to Horyuji Temple. Bus route D connects the bus station at Nara Station and the bus station Horyuji East. Bus route D is less convenient to visit Horyuji Temple as the bus station Horyuji East is remote from Horyuji Temple compared with Horyuji Front station. Bus route E connects the bus station City Hall Front which is twenty minutes' walk from Nara Station instead of the bus station at Nara Station, and the bus station Horyuji Front. Bus route E is inconvenient to visit Horyuji Temple. In this case, first, second and third priorities are assigned, respectively, to bus route C, bus route D and bus route E as priorities of respective information items relevant to Horyuji Temple. As shown in FIGS. 6A–6C, information items include data indicating these priorities.

Figure 8A:
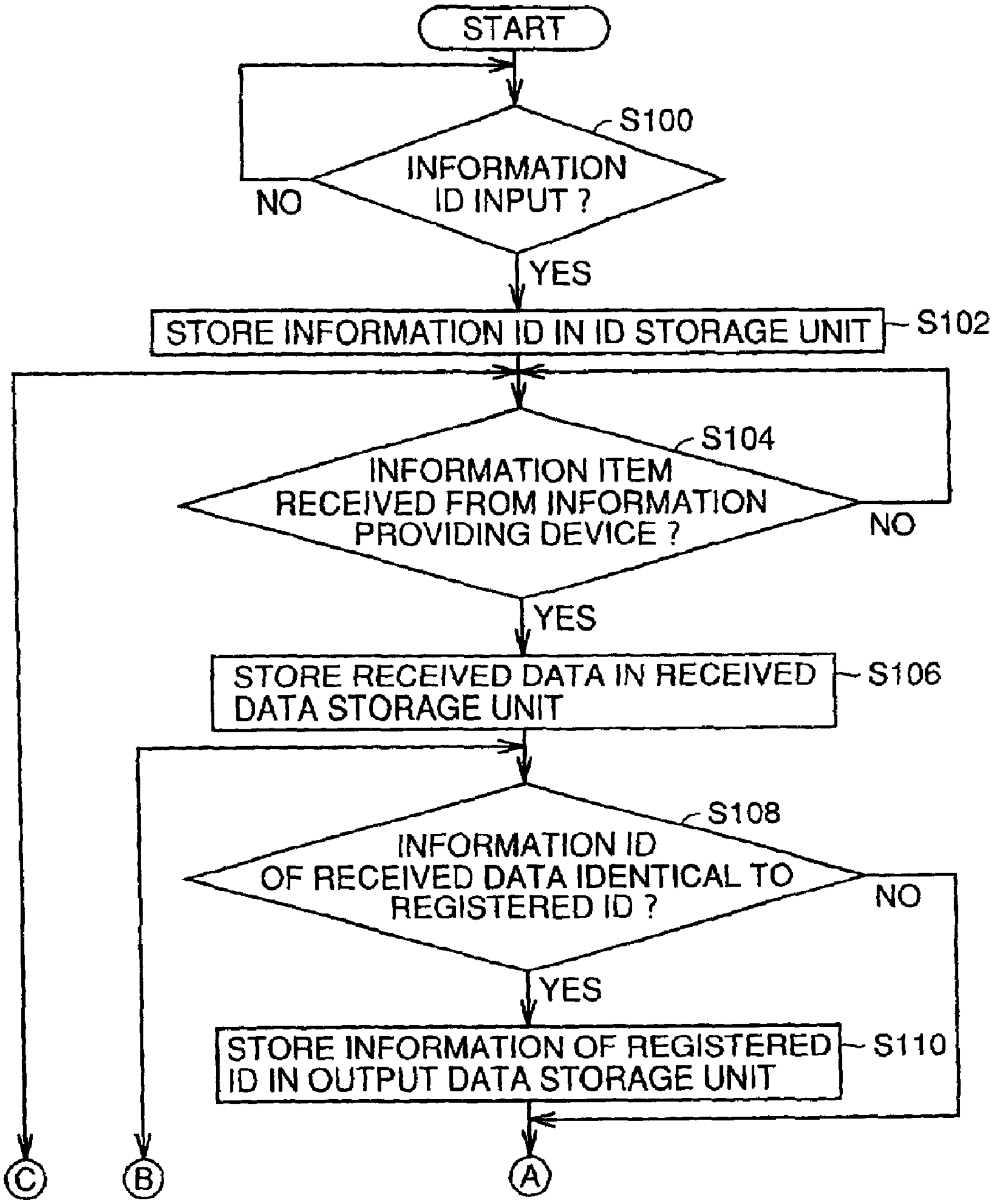
FIGS. 8A and 8B are flow charts showing a process procedure of an information providing method according to the first embodiment.
Figure 8B:
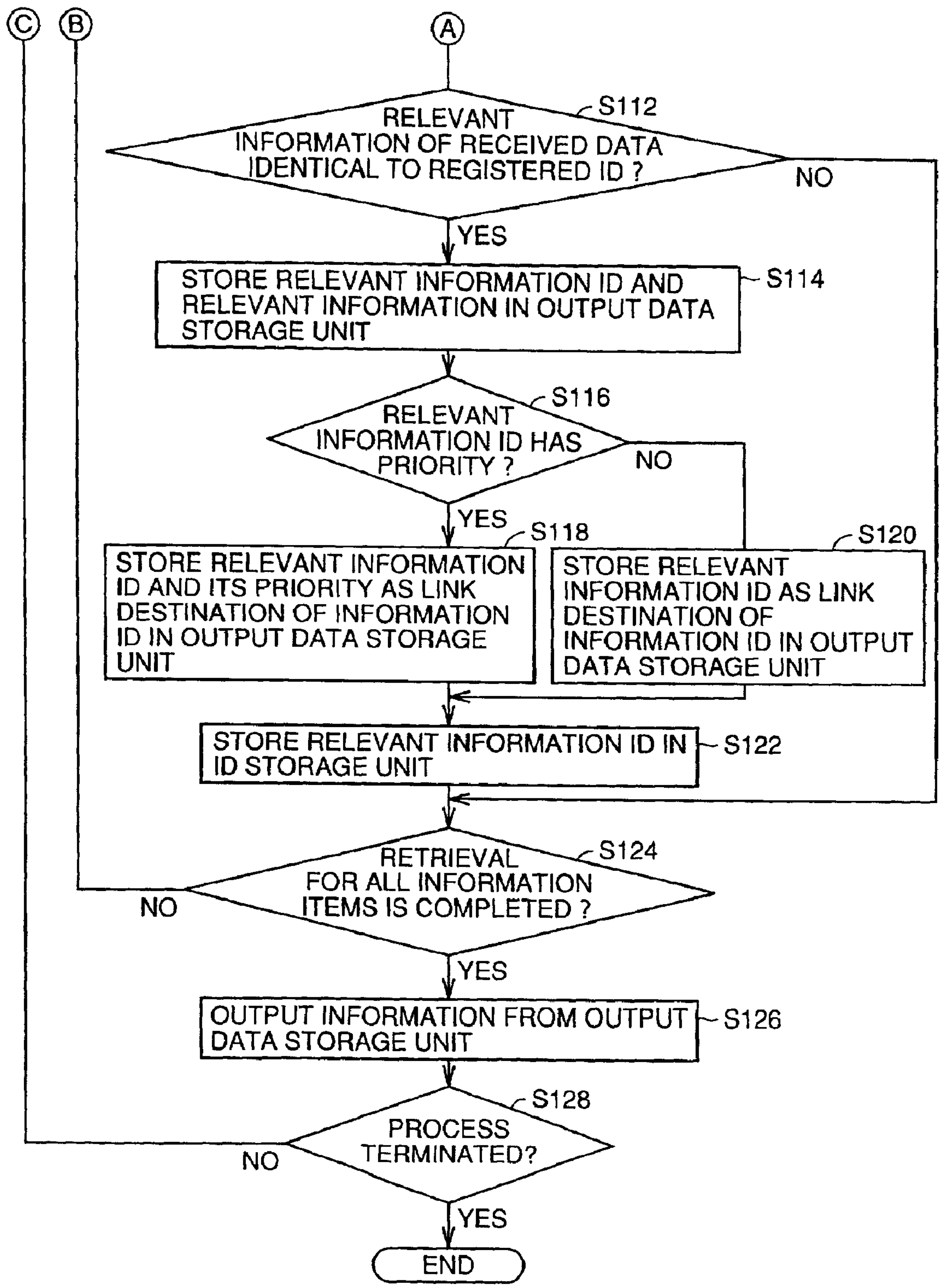

Referring to FIGS. 8A and 8B, receiving terminal device 100 of the information providing system executes a program having a control structure as described below. It is noted that information providing device 200 transmits, when receiving terminal device 100 is detected that is present in an area where transmission from transmission unit 210 is possible, an information item (information ID, information, relevant information ID, and priority) to that detected receiving terminal device 100 by means of radio.

In step 100 ("step" is hereinafter abbreviated as "S"), the CPU of receiving terminal device 100 decides whether an information ID is entered by input unit 114. When the information ID is entered (YES in S100), the process proceeds to S102. If no information ID is entered (NO in S100), the process returns to S100 and waits for input of any information ID. The information ID is entered by selecting it from those stored in advance in ID storage unit 124.

In S102, the CPU stores the information ID entered in S100.

In S104, the CPU decides whether or not an information item is received from information providing device 200. This decision is made by judging whether an information item is received from information providing device 200 via reception unit 112 of receiving terminal device 100. As described above, when receiving terminal device 100 enters an area where radio communication is possible from transmission unit 210 of information providing device 200, reception unit 112 receives an information item transmitted from transmission unit 210. When reception unit 112 receives an information item (YES in S104), the process proceeds to S106. When no information item is received by reception unit 112 (NO in S104), the process returns to S104 to wait for any information item supplied from information providing device 200.

In S106, the CPU stores the information item received in S104 in received data storage unit 122. The information item stored at this time includes information ID, information, relevant information ID and priority.

In S108, the CPU decides whether the first information item stored in received data storage unit 122 in S106 contains an information ID that matches the information ID stored in ID storage unit 124 in S102. If the information item includes an information ID matching the stored information ID (YES in S108), the process proceeds to S110. Otherwise (NO in S108), the process proceeds to S112. In S110, the CPU stores the information item retrieved in S108 in output data storage unit 126.

In S112, the CPU decides whether or not the first information item stored in received data storage unit 122 in S106 includes a relevant information ID that matches the information ID stored in ID storage unit 124 in S102. If the information item includes a relevant information ID matching the stored information ID (YES in S112), the process proceeds to S114. Otherwise (NO in S112), the process proceeds to S124. In S114, the CPU stores the information item extracted in S110 in output data storage unit 126.

In S116, the CPU decides whether there is any data indicating priority of the relevant information ID. As shown in FIGS. 6A–6C, if data indicating priority is included (YES in S116), the process proceeds to S118. If there is no data indicating priority as shown in FIGS. 5A–5E (NO in S116), the process proceeds to S120.

In S118, the CPU stores in output data storage unit 126 the relevant information ID and its priority as a link destination of the information ID retrieved in S108. Referring to FIG. 9, with respect to the information ID indicating "Horyuji Temple," output data storage unit 126 stores the relevant information ID indicating "bus route C" having the first priority as a first link, the relevant information ID indicating "bus route D" having the second priority as a second link, and the relevant information ID indicating "bus route E" having the third priority as a third link.

In S120, the CPU stores in output data storage unit 126, the relevant information ID as a link destination of the information ID retrieved in S108. The CPU gives instructions to retrieval unit 142 to carry out the steps from S108 to S120.

In S122, the CPU additionally stores the relevant information ID retrieved in S112 in ID storage unit 124. The CPU gives instructions to relevant information ID extraction unit 144 to perform this step.

In S124, the CPU decides if the retrieval is completed for all information items in received data storage unit 122. If not (NO in S124), the process returns to S108 to execute the steps S108–S122 for a next information item. If the extraction for the information items is completed (YES in S124), the process proceeds to S126.

In S126, the information item stored in output data storage unit 126 is displayed by the CPU on a display monitor or the like that corresponds to output unit 116. The process thereafter proceeds to S128.

In S128, the CPU decides if the entire process is terminated or not. This decision is made by judging whether or not a process termination command is input by input unit 114. If no process termination command is entered (NO in S128), the process returns to S104 and receiving terminal device 100 moves to wait for any information item supplied from another information providing device 200 that is different from the information providing device discussed above. When the process termination command is entered (YES in S128), this process is terminated.

An operation of the information providing system in accordance with the structure and flowchart heretofore discussed is described. This operation is applied to a user carrying receiving terminal device 100 who travels from the user's home in a Tokyo suburb to Horyuji Temple.

As shown in FIGS. 2 and 3A, the user enters at home the information ID indicating the destination of travel, "Horyuji Temple," from input unit 114 of receiving terminal device 100 (YES in S100). The entered information ID is stored (S102).

The user of receiving terminal device 100 takes along receiving terminal device 100 to travel from the user's home to Tokyo Station. When the user arrives at Tokyo Station, transmission unit 210 of information providing device 200 placed at Tokyo Station transmits an information item and reception unit 112 of receiving terminal device 100 receives that information item (YES in S104). The received information item is stored in received data storage unit 122 (S106). An information item is retrieved from stored information items that includes an information ID matching the information ID stored in ID storage unit 124 (S108), and the retrieved one is stored in output data storage unit 126. The information item stored in output data storage unit 126 is displayed as shown in FIG. 3B on a display monitor or the like as output unit 116.

Figure 10A:
FIGS. 10A–10C and FIGS. 11A–11C show exemplary pictures displayed by the information receiving device according to the first embodiment.
Figure 10B:
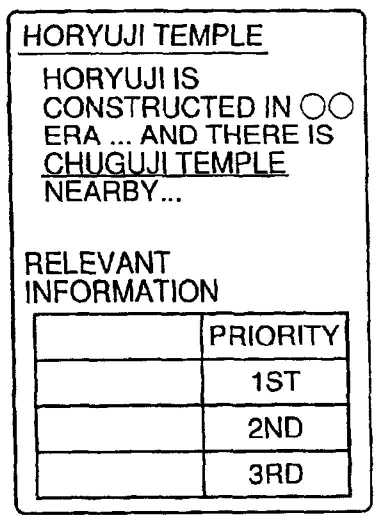
Figure 10C:
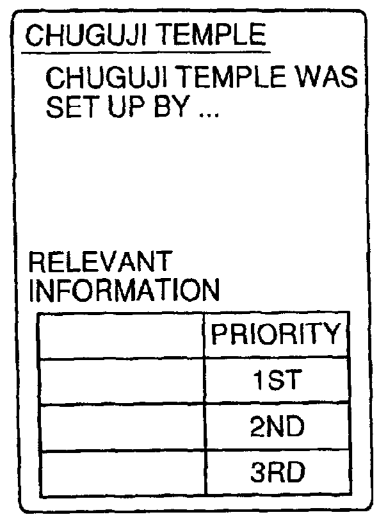

An information item containing an information ID identical to the information ID stored in ID storage unit 124 is retrieved. If the information item like that shown in FIG. 5C or FIG. 5D is stored in received data storage unit 122, pictures as shown in FIGS. 10A–10C are presented on a display monitor or the like as the output unit. As shown in FIG. 10A, "Horyuji Temple" corresponding to the information ID entered from input unit 114 is displayed. When a command to proceed to the next information or a next-page command is entered by input unit 114, detailed information about "Horyuji Temple" as shown in FIG. 10B or information about "Chuguji Temple" relevant to "Horyuji Temple" as shown in FIG. 10C is displayed.

When the user carrying receiving terminal device 100 travels from Tokyo Station to reach Nara Station, reception unit 112 of receiving terminal device 100 receives an information item sent from transmission unit 210 of information providing device 200 placed at Nara Station (NO in S128, YES in S104). As discussed above, an information item containing an information ID identical to the information ID stored in ID storage unit 124 is retrieved from received information items (S108), and the retrieved one is stored in output data storage unit 126. The information item stored in output data storage unit 126 is displayed on a display monitor or the like as the output unit as shown in FIG. 3C.

Figure 11A:
Figure 11B:
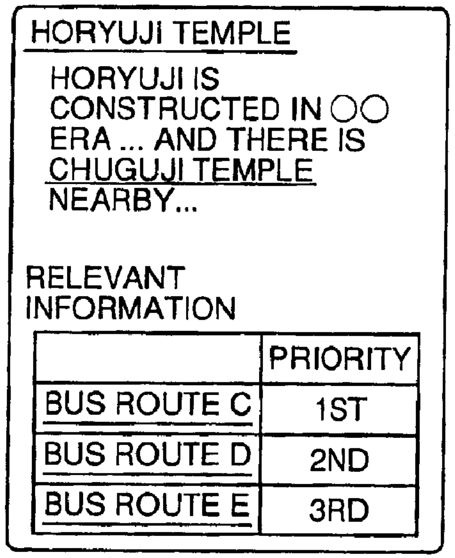
Figure 11C:
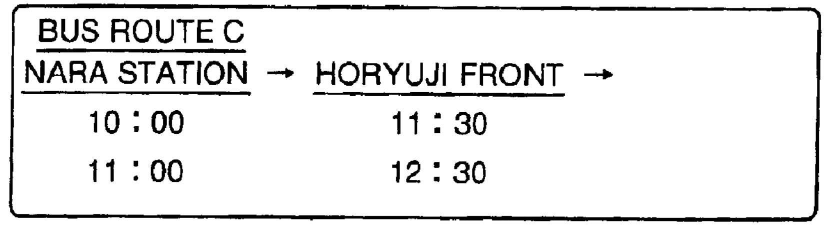

An information item including an information ID identical to the information ID stored in ID storage unit 124 is retrieved. If information items like those shown in FIGS. 6A–6C are stored in received data storage unit 122, indications as shown in FIGS. 11A–11C are presented on a display monitor or the like as the output unit. As shown in FIG. 11A, "Horyuji Temple" corresponding to the information ID entered from input unit 114 is displayed. Input of a command to proceed to the next information or a next-page command by input unit 114 causes presentation of information about "Horyuji Temple," a list of relevant information and priority as shown in FIG. 11B. "Bus route C" with the first priority is selected by input unit 114 and then information about "bus route C" having the first priority among bus routes relating to "Horyuji Temple" is displayed as shown in FIG. 11C (S108).

The information providing devices placed respectively at Tokyo Station and Nara Station have the same structure. However, data storage unit 220 of the information providing device placed at Nara Station closer to Horyuji Temple stores more detailed information about Horyuji Temple. This means that the user can be provided with more detailed information about the destination as the user approaches that destination. Managing agent 204 of information providing device 200 located at Tokyo Station has difficulty in acquiring the positional relation between Nara Station and the bus stop at Horyuji Temple as well as the priority of bus routes according to the positional relation. On the other hand, managing agent 304 of information providing device 300 located at Nara Station closer to the destination, Horyuji Temple, can readily obtain such detailed information. The managing agents thus hold respective information details to different degrees and accordingly more particular information can be supplied to the user as the user approaches the destination. In other words, depending on the distance between a location where an information providing device is placed and a location specified by an information ID, information of an appropriate particularity can be provided to an information receiving device. Such information having proper details is achieved by designating in advance locations of information providing devices and allowing the information providing devices to hold information of respective levels of particularities different from each other. Specifically, an information providing device located closer to any place regarding an information item specified by an information ID stores information of a greater particularity about that information item.

As heretofore discussed, in the information providing system according to the first embodiment, when an information receiving device receives an information item from an information providing device which is closer to an area specified by an information ID, the receiving device can output local information of a greater particularity regarding the area specified by the information ID. It is thus possible to provide an information providing system for supplying data from a plurality of information providing devices to an information receiving device that enables the information receiving device to output information adapted for an area where the receiving device receives that information.

Second Embodiment

The second embodiment is now described. Details of the hardware structure and process flow chart that are not explained below are identical to those of the first embodiment and description thereof is not repeated where appropriate.

In an information providing system according to the second embodiment, the retrieval operation performed by the receiving terminal device in the first embodiment is done by the information providing device.

Figure 12:
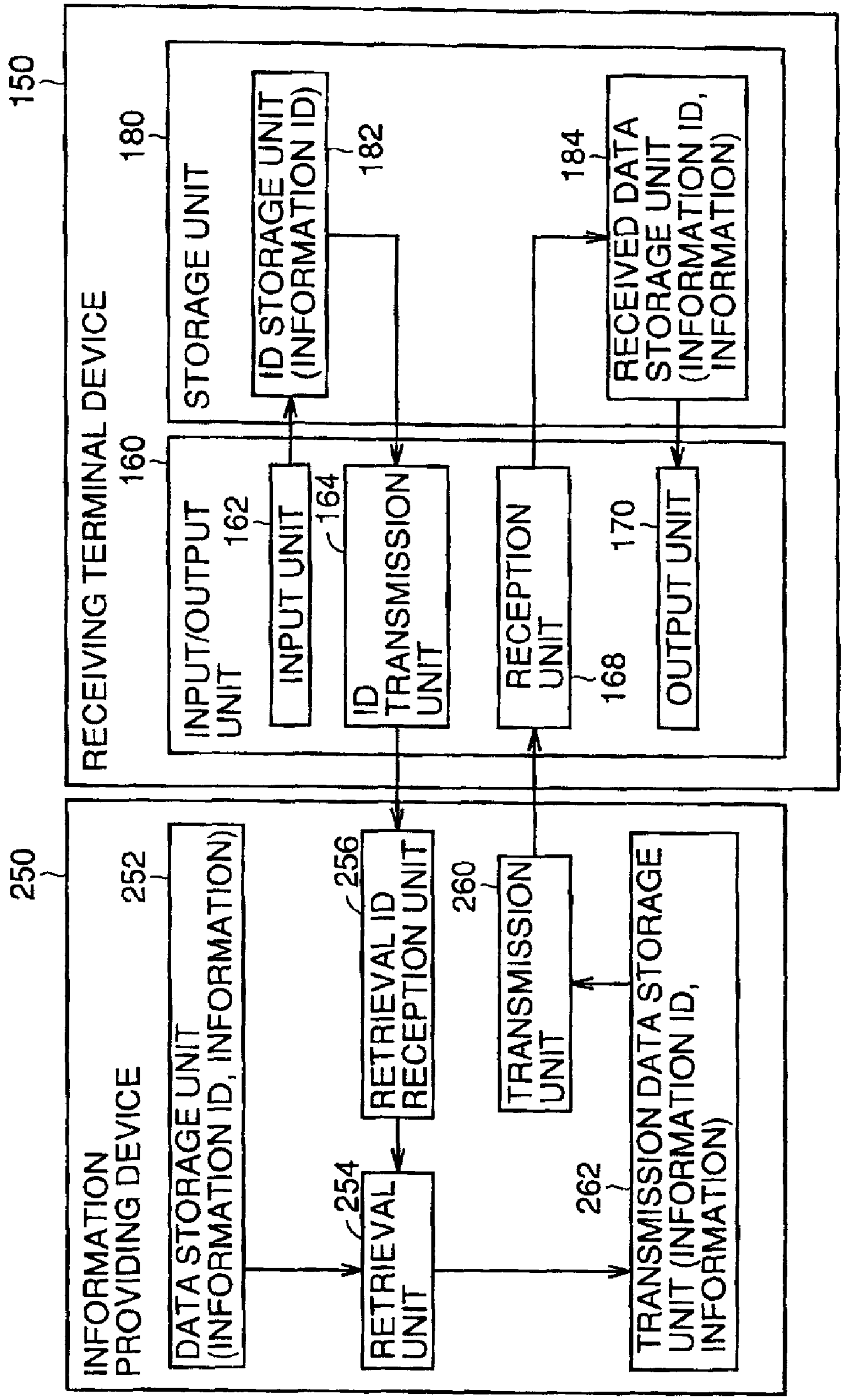
FIG. 12 is a control block diagram of an information providing device and a receiving terminal device according to a second embodiment.

Referring to FIG. 12, the information providing system according to the second embodiment includes a portable receiving terminal device 150 and an information providing device 250 transmitting information to receiving terminal device 150.

Receiving terminal device 150 includes an input/output unit 160 connected to information providing device 250 for receiving an information item containing information ID and information, and a storage unit 180 connected to input/output unit 160 for storing the information item received from information providing device 250. Receiving terminal device 150 further includes a processor (not shown) for controlling input/output unit 160 and storage unit 180. The processor includes a CPU, an ROM for recording programs executed by the CPU and various data, and an RAM for storing intermediate data in processing executed by the CPU (these components are not shown).

Information providing device 250 includes a data storage unit 252 for storing an information item formed of an information ID and information, a retrieval ID reception unit 256 for receiving an information ID from input/output unit 160 of receiving terminal device 150, a retrieval unit 254 connected to data storage unit 252 and retrieval ID reception unit 256 for retrieving an information item stored in data storage unit 252 according to the received information ID, a transmission data storage unit 262 connected to retrieval unit 254 for storing an information item to be transmitted to receiving terminal device 150, and a transmission unit 260 connected to transmission data storage unit 262 for transmitting the retrieved information item to receiving terminal device 150. Information providing device 250 further includes a control unit for controlling data storage unit 252, retrieval unit 254, retrieval ID reception unit 256, transmission unit 260 and transmission data storage unit 262.

Data storage unit 252, retrieval unit 254 and transmission unit 260 correspond respectively to data storage unit 220, retrieval unit 142 and transmission unit 210 of the first embodiment and respective structures of components corresponding to each other are the same. Then, detailed description thereof is not repeated where appropriate.

Retrieval ID reception unit 256 receives, from an ID transmission unit 164 of receiving terminal device 150 described later, an information ID entered by receiving terminal device 150. The received information ID is transmitted to retrieval unit 254. Transmission data storage unit 262 has a function of transferring a retrieved information item to transmission unit 260 in addition to the function of output data storage unit 126 of the first embodiment.

Input/output unit 160 includes an input unit 162 such as numerical keypad for entering an information ID, ID transmission unit 164 connected to an ID storage unit 182 of storage unit 180 discussed later for transmitting the information ID entered by input unit 162 to information providing device 250, a reception unit 168 receiving information supplied from information providing device 250, and an output unit 170 displaying a received information item. Input unit 162 and output unit 170 correspond respectively to input unit 114 and input unit 116 of the first embodiment and respective structures of components corresponding to each other are the same. Then, detailed description thereof is not repeated where appropriate.

Connection of ID transmission unit 164 and reception unit 168 with information providing device 250 may be implemented by radio communication or wired communication. According to the second embodiment, radio communication is employed. In this case, when receiving terminal device 150 enters into an area where radio waves from information providing device 250 reach, ID transmission unit 164 of receiving terminal device 150 transmits an information ID to information providing device 250. Reception unit 168 of receiving terminal device 150 receives from information providing device 250 an information item (information ID, information) retrieved by using the transmitted information ID.

Storage unit 180 includes a received data storage unit 184 connected to reception unit 168 and output unit 170 for storing the information item (information ID, information) received from information providing device 250, and an ID storage unit 182 connected to input unit 162 and ID transmission unit 164 for storing the information ID entered by input unit 162. ID storage unit 182 and received data storage unit 184 correspond respectively to ID storage unit 124 and output data storage unit 126 of the first embodiment and corresponding components have the same structure. Then, detailed description thereof is not repeated where appropriate.

A program executed by the receiving terminal device 150 and the information providing device 250 in such an information providing system differs from that illustrated by the flowchart of the first embodiment in terms of the following steps.

After the process in S100 and S102, the CPU of receiving terminal device 150 transmits the information ID stored in information ID storage unit 180 to information providing device 250 placed in an area where radio communication is possible.

The control unit of information providing device 250 transmits the information ID from receiving terminal device 150 that is received by the retrieval ID reception unit 256 to retrieval unit 254. The control unit retrieves by retrieval unit 254 an information item including an information ID identical to the received information ID from information items stored in data storage unit 252. The retrieved information item is stored in transmission data storage unit 262. When the retrieval is completed for all information items stored in data storage unit 252, the control unit transmits by transmission unit 260 the information item stored in transmission data storage unit 262 to receiving terminal device 150.

The CPU of receiving terminal device 150 receives by reception unit 168 the information item retrieved by retrieval unit 254 of information providing device 250, and then stores the received information item in received data storage unit 184. The information item stored in received data storage unit 184 is output to a display monitor or the like corresponding to output unit 170.

An operation of the information providing system in accordance with the structure and flowchart as described above is explained. The operation discussed here applies to a user carrying receiving terminal device 150 who travels from the user's home in a Tokyo suburb to Horyuji Temple. Similarly to the first embodiment, depending on the distance between a location where an information providing device is placed and a location specified by an information ID, information providing devices hold respective information contents different in particularity levels from each other.

As shown in FIGS. 2 and 3A, the user enters at home the information ID indicating the destination of travel, "Horyuji Temple," from input unit 114 of receiving terminal device 150 (YES in S100). The entered information ID is stored in information ID storage unit 182 (S102).

The user of receiving terminal device 150 takes along receiving terminal device 150 to travel from the user's home to Tokyo Station. When the user arrives at Tokyo Station, receiving terminal device 150 detects the presence of information providing device 250 placed at Tokyo Station and then transmits the information ID from ID transmission unit 164 to retrieval ID reception unit 256 of information providing device 250. Information providing device 250 retrieves from information items stored in data storage unit 252 an information item containing an information ID that matches the information ID received by retrieval ID reception unit 256. The retrieved information item is stored in transmission data storage unit 262. The information item stored in transmission data storage unit 262 is transmitted from transmission unit 260 to reception unit 168 of receiving terminal device 150. Receiving terminal device 150 stores the information item received by reception unit 168 in received data storage unit 184. Receiving terminal device 150 displays the information item on a display monitor or the like which is output unit 170 as shown in FIG. 3B.

When the user carrying receiving terminal device 150 travels from Tokyo Station to arrive at Nara Station, receiving terminal device 150 detects the presence of information providing device 250 placed at Nara Station to transmit the information ID from ID transmission unit 164 to retrieval ID reception unit 256 of information providing device 250. As described above, information providing device 250 retrieves an information item containing an information ID matching the information ID received by the retrieval ID reception unit 256. The retrieved information item is stored in transmission data storage unit 262. The information item stored in transmission data storage unit 262 is supplied from transmission unit 260 to reception unit 168 of receiving terminal device 150. Receiving terminal device 150 stores the information item received by reception unit 168 in received data storage unit 184. This information item is displayed by receiving terminal device 150 as shown in FIG. 3C on a display monitor or the like corresponding to output unit 170.

Receiving terminal device 150 of the information providing system according to the second embodiment requires no data storage unit 184 of a great memory capacity and a retrieval unit for retrieving an information item according to an information ID. Accordingly, the size of the receiving terminal device can be reduced, which enhances portability.

As heretofore discussed, in the information providing system according to the second embodiment, the information receiving device transmits an information ID to an information providing device located closer to an area specified by the information ID. The information receiving device then receives a retrieved information item that provides more detailed local information regarding an area specified by the information ID. Accordingly, it is possible to provide an information providing system for transmitting data to an information receiving device from a plurality of information providing devices that enables the information receiving device to output information adapted for a location where the receiving device receives that information.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An information receiving apparatus, receiving information from a plurality of information providing apparatuses, said information providing apparatuses each including an information storage circuit storing a plurality of information items and a transmission circuit transmitting the information items stored in said information storage circuit to said information receiving apparatus, said plurality of information items each containing information and information identification data for identifying said information, said information identification data being common to said plurality of information providing apparatuses, the information contained in said information items that are identified by the same said information identification data differing depending on said information providing apparatuses, and said information receiving apparatus comprising:

an identification data storage circuit storing information identification data for identifying information to be selected;

a reception circuit receiving said plurality of information items from an arbitrary one of said plurality of information providing apparatuses;

a storage circuit connected to said reception circuit for storing said information items received by said reception circuit; and an output circuit connected to said identification data storage circuit and said storage circuit for selecting and outputting an information item having a predetermined relation with the information identification data stored in said identification data storage circuit from the information items stored in said storage circuit, wherein the information identification data is automatically transmitted to at least one of the information providing apparatuses when the information receiving apparatus enters a geographic area where the at least one information providing apparatus is located.

2. The information receiving apparatus according to claim 1, wherein said output circuit includes a circuit for selecting and outputting an information item containing information identification data matching the information identification data stored in said identification data storage circuit from the information items stored in said storage circuit.

3. The information receiving apparatus according to claim 1, wherein said information item further contains relevant information identification data for identifying information relevant to the information contained in said information item and priority of said relevant information, and said output circuit includes a circuit for selecting an information item containing relevant information identification data matching the information identification data stored in said identification data storage circuit from the information items stored in said storage circuit and then outputting said selected information item according to priority contained in said selected information item.

4. The information receiving apparatus according to claim 1, further comprising an input circuit connected to said identification data storage circuit for entering information identification data of information to be selected.

5. The information receiving apparatus according to claim 1, wherein the information contained in said information items that are identified by the same said information identification data includes information differing depending on respective locations of said information providing apparatuses.

6. The information receiving apparatus according to claim 1, wherein the information contained in said information items that are identified by the same said information identification data includes information differing depending on respective locations of said information providing apparatuses and time.

7. The information receiving apparatus according to claim 1, wherein the information contained in said information items includes local information associated with a local area, and said local information is identified by local information identification data and said local information includes information which is more detailed as location of said information providing apparatus is closer to a local area specified by said local information identification data.

8. The information receiving apparatus according to claim 1, wherein said information item further contains relevant information identification data for identifying information relevant to the information contained in said information item, and said output circuit includes a circuit for selecting and outputting an information item containing either information identification data or relevant information identification data matching the information identification data stored in said identification data storage circuit from the information items stored in said storage circuit.

9. The information receiving apparatus according to claim 8, wherein said identification data storage circuit includes a circuit for storing information identification data of information to be selected and relevant information identification data contained in an information item, among the information items stored in said storage circuit, that contains information identification data matching the information identification data stored in said identification data storage circuit, and said output circuit includes a circuit for selecting and outputting an information item, from the information items stored in said storage circuit, that contains either information identification data or relevant information identification data matching either the information identification data or the relevant information identification data stored in said identification data storage circuit.

10. An information receiving apparatus receiving information from a plurality of information providing apparatuses, said information providing apparatuses each including an information storage circuit storing a plurality of information items, said plurality of information items each containing information and information identification data for identifying said information, said information identification data being common to said plurality of information providing apparatuses, the information contained in said information items that are identified by the same said information identification data differing depending on said information providing apparatuses, said information providing apparatuses each further including a transmission circuit for selecting an information item having a predetermined relation with said identification data from the information items stored in said information storage circuit and then transmitting the selected information item to said information receiving apparatus, and said information receiving apparatus comprising:

an identification data storage circuit storing information identification data for identifying information to be selected;

an identification data transmission circuit connected to said identification data storage circuit for transmitting the information identification data stored in said identification data storage circuit to an arbitrary one of said information providing apparatuses;

a reception circuit receiving said selected information item transmitted from said arbitrary one of said information providing apparatuses in response to the information identification data transmitted by said identification data transmission circuit;

a storage circuit connected to said reception circuit for storing said information item received by said reception circuit; and an output circuit connected to said storage circuit for outputting the information item stored in said storage circuit, wherein the information identification data is automatically transmitted to at least one of the information providing apparatuses when the information receiving apparatus enters a geographic area where the at least one information providing apparatus is located.

11. The information receiving apparatus according to claim 10, further comprising an input circuit connected to said identification data storage circuit for entering information identification data of information to be selected.

12. The information receiving apparatus according to claim 10, wherein the information contained in said information items that are identified by the same said information identification data includes information differing depending on respective locations of said information providing apparatuses.

13. The information receiving apparatus according to claim 10, wherein the information contained in said information items that are identified by the same said information identification data includes information differing depending on respective locations of said information providing apparatuses and time.

14. The information receiving apparatus according to claim 10, wherein the information contained in said information items includes local information associated with a local area, and said local information is identified by local information identification data and said local information includes information which is more detailed as location of said information providing apparatus is closer to a local area specified by said local information identification data.

15. An information providing apparatus employed in an information providing system including an information receiving apparatus and a plurality of information providing apparatuses transmitting information to said information receiving apparatus, said information providing apparatus comprising:

an information storage circuit storing a plurality of information items, said plurality of information items each containing information and information identification data for identifying said information, said information identification data being common to said plurality of information providing apparatuses, and the information contained in said information items that are identified by the same said information identification data differing depending on said information providing apparatuses;

said information providing apparatus further comprising a reception circuit receiving information identification data from said information receiving apparatus;

an identification data storage circuit connected to said reception circuit for storing said received information identification data; and a transmission circuit connected to said information storage circuit and said identification data storage circuit for selecting an information item having a predetermined relation with the identification data stored in said identification data storage circuit from the information items stored in said information storage circuit and then transmitting the selected information item to said information receiving apparatus, wherein the information identification data is automatically transmitted to at least one of the information providing apparatuses when the information receiving apparatus enters a geographic area where the at least one information providing apparatus is located.

16. The information providing apparatus according to claim 15, wherein said transmission circuit includes a circuit for selecting an information item containing information identification data matching the information identification data stored in said identification data storage circuit from the information items stored in said information storage circuit and then transmitting said selected information item to said information receiving apparatus.

17. The information providing apparatus according to claim 15, wherein said information item further contains relevant information identification data for identifying information relevant to the information contained in said information item and priority of said relevant information, and said transmission circuit includes a circuit for selecting an information item containing relevant information identification data matching the information identification data stored in said identification data storage circuit from the information items stored in said information storage circuit and then transmitting said selected information item according to priority contained in said selected information item.

18. The information providing apparatus according to claim 15, wherein the information contained in said information items that are identified by the same said information identification data includes information differing depending on respective locations of said information providing apparatuses.

19. The information providing apparatus according to claim 15, wherein the information contained in said information items that are identified by the same said information identification data includes information differing depending on respective locations of said information providing apparatuses and time.

20. The information providing apparatus according to claim 15, wherein the information contained in said information items includes local information associated with a local area, and said local information is identified by local information identification data and said local information includes information which is more detailed as location of said information providing apparatus is closer to a local area specified by said local information identification data.

21. The information providing apparatus according to claim 15, wherein said information item further contains relevant information identification data for identifying information relevant to the information contained in said information item, and said transmission circuit includes a circuit for selecting an information item containing either information identification data or relevant information identification data matching the information identification data stored in said identification data storage circuit from the information items stored in said information storage circuit and then transmitting said selected information item to said information receiving apparatus.

22. The information providing apparatus according to claim 21, wherein said identification data storage circuit includes a circuit for storing information identification data received by said identification data reception circuit and relevant information identification data contained in an information item, among the information items stored in said information storage circuit, that contains information identification data matching said received information identification data, and said transmission circuit includes a circuit for selecting an information item, from the information items stored in said information storage circuit, that contains either information identification data or relevant information identification data matching either the information identification data or the relevant information identification data stored in said identification data storage circuit and then transmitting said selected information item to said information receiving apparatus.

23. An information receiving apparatus receiving information from a plurality of information providing apparatuses, said information providing apparatuses each including information storage means for storing a plurality of information items and transmission means for transmitting the information items stored in said information storage means to said information receiving apparatus, said plurality of information items each containing information and information identification data for identifying said information, said information identification data being common to said plurality of information providing apparatuses, the information contained in said information items that are identified, by the same said information identification data differing depending on said information providing apparatuses, and said information receiving apparatus comprising:

identification data storage means for storing information identification data for identifying information to be selected;

reception means for receiving said plurality of information items from an arbitrary one of said plurality of information providing apparatuses;

storage means connected to said reception means for storing said information items received by said reception means; and output means connected to said identification data storage means and said storage means for selecting and outputting an information item having a predetermined relation with the information identification data stored in said identification data storage means from the information items stored in said storage means, wherein the information identification data is automatically transmitted to at least one of the information providing apparatuses when the information receiving apparatus enters a geographic area where the at least one information providing apparatus is located.

24. The information receiving apparatus according to claim 23, wherein said output means includes means for selecting and outputting an information item containing information identification data matching the information identification data stored in said identification data storage means from the information items stored in said storage means.

25. The information receiving apparatus according to claim 23, wherein said information item further contains relevant information identification data for identifying information relevant to the information contained in said information item and priority of said relevant information, and said output means includes means for selecting an information item containing relevant information identification data matching the information identification data stored in said identification data storage means from the information items stored in said storage means and then outputting said selected information item according to priority contained in said selected information item.

26. The information receiving apparatus according to claim 23, further comprising input means connected to said identification data storage means for entering information identification data of information to be selected.

27. The information receiving apparatus according to claim 23, wherein the information contained in said information items that are identified by the same said information identification data includes information differing depending on respective locations of said information providing apparatuses.

28. The information receiving apparatus according to claim 23, wherein the information contained in said information items that are identified by the same said information identification data includes information differing depending on respective locations of said information providing apparatuses and time.

29. The information receiving apparatus according to claim 23, wherein the information contained in said information items includes local information associated with a local area, and said local information is identified by local information identification data and said local information includes information which is more detailed as location of said information providing apparatus is closer to a local area specified by said local information identification data.

30. The information receiving apparatus according to claim 23, wherein said information item further contains relevant information identification data for identifying information relevant to the information contained in said information item, and said output means includes means for selecting and outputting an information item containing either information identification data or relevant information identification data matching the information identification data stored in said identification data storage means from the information items stored in said storage means.

31. The information receiving apparatus according to claim 30, wherein said identification data storage means includes means for storing information identification data of information to be selected and relevant information identification data contained in an information item, among the information items stored in said storage means, that contains information identification data matching the information identification data stored in said identification data storage means, and said output means includes means for selecting and outputting an information item, from the information items stored in said storage means, that contains either information identification data or relevant information identification data matching either the information identification data or the relevant information identification data stored in said identification data storage means.

32. An information receiving apparatus receiving information from a plurality of information providing apparatuses, said information providing apparatuses each including information storage means for storing a plurality of information items, said plurality of information items each containing information and information identification data for identifying said information, said information identification data being common to said plurality of information providing apparatuses, the information contained in said information items that are identified by the same said information identification data differing depending, on said information providing apparatuses, said information providing apparatuses each further including transmission means for selecting an information item having a predetermined relation with said identification data from the information items stored in said information storage means and then transmitting the selected information item to said information receiving apparatus, and said information receiving apparatus comprising:

identification data storage means for storing information identification data for identifying information to be selected;

identification data transmission means connected to said identification data storage means for transmitting the information identification data stored in said identification data storage means to an arbitrary one of said information providing apparatuses;

reception means for receiving said selected information item transmitted from said arbitrary one of said information providing apparatuses in response to the information identification data transmitted by said identification data transmission means;

storage means connected to said reception means for storing said information item received by said reception means; and output means connected to said storage means for outputting the information item stored in said storage means, wherein the information identification data is automatically transmitted to at least one of the information providing apparatuses when the information receiving apparatus enters a geographic area where the at least one information providing apparatus is located.

33. The information receiving apparatus according to claim 32, further comprising input means connected to said identification data storage means for entering information identification data of information to be selected.

34. The information receiving apparatus according to claim 32, wherein the information contained in said information items that are identified by the same said information identification data includes information differing depending on respective locations of said information providing apparatuses.

35. The information receiving apparatus according to claim 32, wherein the information contained in said information items that are identified by the same said information identification data includes information differing depending on respective locations of said information providing apparatuses and time.

36. The information receiving apparatus according to claim 32, wherein the information contained in said information items includes local information associated with a local area, and said local information is identified by local information identification data and said local information includes information which is more detailed as location of said information providing apparatus is closer to a local area specified by said local information identification data.

37. An information providing apparatus employed in an information providing system including an information receiving apparatus and a plurality of information providing apparatuses transmitting information to said information receiving apparatus, said information providing apparatus comprising:

information storage means for storing a plurality of information items, said plurality of information items each containing information and information identification data for identifying said information, said information identification data being common to said plurality of information providing apparatuses, and the information contained in said information items that are identified by the same said information identification data differing depending on said information providing apparatuses;

said information providing apparatus further comprising reception means for receiving information identification data from said information receiving apparatus;

identification data storage means connected to said reception means for storing said received information identification data; and transmission means connected to said information storage means and said identification data storage means for selecting an information item having a predetermined relation with the identification data stored in said identification data storage means from the information items stored in said information storage means and then transmitting the selected information item to said information receiving apparatus, wherein the information identification data is automatically transmitted to at least one of the information providing apparatuses when the information receiving apparatus enters a geographic area where the at least one information providing apparatus is located.

38. The information providing apparatus according to claim 37, wherein said transmission means includes means for selecting an information item containing information identification data matching the information identification data stored in said identification data storage means from the information items stored in said information storage means and then transmitting said selected information item to said information receiving apparatus.

39. The information providing apparatus according to claim 37, wherein said information item further contains relevant information identification data for identifying information relevant to the information contained in said information item and priority of said relevant information, and said transmission means includes means for selecting an information item containing relevant information identification data matching the information identification data stored in said identification data storage means from the information items stored in said information storage means and then transmitting said selected information item according to priority contained in said selected information item.

40. The information receiving apparatus according to claim 37, wherein the information contained in said information items that are identified by the same said information identification data includes information differing depending on respective locations of said information providing apparatuses.

41. The information receiving apparatus according to claim 37, wherein the information contained in said information items that are identified by the same said information identification data includes information differing depending on respective locations of said information providing apparatuses and time.

42. The information receiving apparatus according to claim 37, wherein the information contained in said information items includes local information associated with a local area, and said local information is identified by local information identification data and said local information includes information which is more detailed as location of said information providing apparatus is closer to a local area specified by said local information identification data.

43. The information providing apparatus according to claim 37, wherein said information item further contains relevant information identification data for identifying information relevant to the information contained in said information item, and said transmission means includes means for selecting an information item containing either information identification data or relevant information identification data matching the information identification data stored in said identification data storage means from the information items stored in said information storage means and then transmitting said selected information item to said information receiving apparatus.

44. The information providing apparatus according to claim 43, wherein said identification data storage means includes means for storing information identification data received by said identification data reception means and relevant information identification data contained in an information item, among the information items stored in said information storage means, that contains information identification data matching said received information identification data, and said transmission means includes means for selecting an information item, from the information items stored in said information storage means, that contains either information identification data or relevant information identification data matching either the information identification data or the relevant information identification data stored in said identification data storage means and then transmitting said selected information item to said information receiving apparatus.

* * * * *